(12) United States Patent
Buffard et al.

(10) Patent No.: US 7,781,903 B2
(45) Date of Patent: Aug. 24, 2010

(54) WAVE ENERGY CONVERTER WITH AIR COMPRESSION (WECWAC)

(75) Inventors: Keith Buffard, East Barnet (GB); Mark Draper, Kenilworth (GB); Keith Robert Pullen, London (GB); Robin Rhodes, Southam (GB)

(73) Assignee: Ocean Power Technologies, Inc., Pennington, NJ (US)

( * ) Notice: Subject to any disclaimer, the term of this patent is extended or adjusted under 35 U.S.C. 154(b) by 536 days.

(21) Appl. No.: 11/803,746

(22) Filed: May 16, 2007

(65) Prior Publication Data

US 2008/0012344 A1 Jan. 17, 2008

Related U.S. Application Data

(60) Provisional application No. 60/800,696, filed on May 16, 2006.

(51) Int. Cl.
F03B 13/10 (2006.01)
F03B 13/12 (2006.01)
H02P 9/04 (2006.01)

(52) U.S. Cl. .......................... 290/42; 290/53
(58) Field of Classification Search .................. 290/42, 290/43, 53, 54; 417/258; 60/398, 498, 501, 60/495, 496, 497
See application file for complete search history.

(56) References Cited

U.S. PATENT DOCUMENTS

| | | | | | |
|---|---|---|---|---|---|
| 1,523,031 | A | * | 1/1925 | Mitchell, Jr. | 417/333 |
| 3,515,889 | A | * | 6/1970 | Kammerer | 290/53 |
| 3,970,415 | A | * | 7/1976 | Widecrantz et al. | 417/332 |
| 4,071,305 | A | * | 1/1978 | Ootsu | 417/334 |
| 4,076,463 | A | * | 2/1978 | Welczer | 417/331 |
| 4,208,878 | A | * | 6/1980 | Rainey | 60/496 |
| 4,281,257 | A | * | 7/1981 | Testa et al. | 290/42 |
| 4,398,095 | A | * | 8/1983 | Ono | 290/53 |
| 4,560,884 | A | * | 12/1985 | Whittecar | 290/42 |
| 5,394,695 | A | * | 3/1995 | Sieber | 60/398 |
| 6,291,904 | B1 | * | 9/2001 | Carroll | 290/53 |
| 6,768,216 | B1 | * | 7/2004 | Carroll et al. | 290/42 |
| 6,930,406 | B2 | * | 8/2005 | Montgomery | 290/42 |

(Continued)

Primary Examiner—Julio C. Gonzalez
(74) Attorney, Agent, or Firm—Henry I. Schanzer, Esq.

(57) ABSTRACT

A wave energy converter with air compression (WECWAC) includes a cylinder and a piston located within the cylinder dividing the cylinder into an upper chamber and a lower chamber. The cylinder is fixedly attached to a spar whose up/down (heave) motion is restrained. The piston is fixedly attached to, and driven by, a float which moves generally in phase with the waves. Under typical wave conditions the piston functions to compress air within the upper chamber on its up stroke and within the lower chamber on its down stroke, i. e., the system is thus double-acting. In still water, the spar and cylinder combination is designed to drift down into the body of water relative to the piston whereby the size/volume of the upper chamber is decreased (while that of the lower chamber is increased). For small amplitude waves the piston continues to compress air in the upper chamber and this asymmetrical compression continues until the waves reach a predetermine level when "double-action" is resumed. Controlling the position of the cylinder relative to the piston enables the WECWAC to automatically regulate its compression 'stroke' to suit varying wave conditions. The pressurized air from a WECWAC may be stored and/or processed to drive a turbo-generator or it may be combined with the outputs of other WECWACs to drive a single large and highly efficient turbo-generator.

10 Claims, 6 Drawing Sheets

U.S. PATENT DOCUMENTS

2004/0251692 A1* 12/2004 Leijon et al. ................. 290/42
2005/0099010 A1* 5/2005 Hirsch ......................... 290/42
2005/0188691 A1* 9/2005 Uhl et al. ..................... 60/495
2006/0242954 A1* 11/2006 Welch ......................... 60/398
2007/0130929 A1* 6/2007 Khan et al. .................. 60/398

* cited by examiner

US 7,781,903 B2

WAVE ENERGY CONVERTER WITH AIR COMPRESSION (WECWAC)

This invention claims priority from U.S. provisional application Ser. No. 60/800,696 titled POWER GENERATION USING WAVE ENERGY AND PNEUMATIC TRANSMISSION filed May 16, 2006.

BACKGROUND

This invention relates to wave energy converters (WECs) for converting energy contained in surface waves on bodies of water into useful energy, e.g., to eventually generate electric power, and to a means for combining the outputs of a plurality of WECs and transmitting the combined output in a practical and efficient manner.

There are many significant challenges in harnessing ocean wave energy effectively. Wave energy is highly variable in frequency and force. The frequency of the waves is generally very low and the force of the waves varies over a wide range (from low to very high). Furthermore, unlike tidal or wind energy, fluid motion is not continuous in direction, with waves rising and falling over a short time period. On the other hand, known efficient electric generators are typically high-speed, low-torque, uni-directional rotary devices. Therefore a major challenge is to find apparatus that will efficiently convert wave energy into a form that can be efficiently used, e.g., to drive an electric generator. Many systems have been proposed. However, there is no system known to us which can satisfy the requirements of efficient energy conversion, long life and low cost.

By way of example of what is known, U.S. Pat. No. 3,697,764 to Stanziola et al teaches the use of wave energy to compress air used to drive turbine generators to generate electric power. Another reference, U.S. Pat. No. 4,012,173 to Everson, Jr., shows the use of a variable stroke compressor powered by waves. In so far as is known, these and other prior art systems have not been manufactured or commercialized due to the impracticality of building and operating such devices.

A significant problem with an air-compression system is the need to operate effectively over a wide range of wave conditions. It is an object of this invention to provide an apparatus and method to enable an air-compressor to automatically modify its stroke so it can operate effectively over a wide range of wave conditions.

SUMMARY OF THE INVENTION

A wave energy converter (WEC) embodying the invention includes a self-regulating variable stroke wave air compressor.

A wave energy converter with air compression (WECWAC) embodying the invention includes a novel power take off (PTO) system. The WECWAC includes two floating bodies interconnected through a power take off (PTO) system. One floating body is a large float which moves generally in phase with the waves. The other floating body is a central 'spar' located within the float. The central 'spar' is a floating body, but its up/down (heave) motion is heavily restrained, e.g., by a large sub-surface 'heave-plate' which limits the up/down motion (heave) of the spar. The PTO converts the reaction forces between the two bodies into useful energy. The PTO includes a cylinder to compress air which is fixedly attached to the spar and a piston which is rigidly connected to and driven by the float. The piston divides the cylinder into an upper chamber and a lower chamber, with the piston positioned between the two chambers to compress air drawn into the chambers. The cylinder is double-acting in that air is compressed in the upper chamber on the up-stroke and in the lower chamber on the down-stroke of float motion. Typically, as shown in FIG. 1A, for a normally anticipated wave condition, the cylinder can be considered to be relatively still while the piston is driven up and down by the float to alternatively compress air in the upper and lower chambers on its up and down strokes.

An important aspect of the invention is that the piston stroke is variable. The buoyancy of the spar is set so that in still water (i.e., low amplitude waves), the spar drifts down and sits low in the water, with only the top part of the cylinder above water. The downward drift of the cylinder (as shown in FIG. 1B) causes the size/volume of the upper chamber to be decreased. As waves increase in height, the WEC begins to compress air in the upper chamber of the cylinder and the spar begins to rise out of the water under the force generated during compression. As waves build up, air is also compressed in the lower chamber of the cylinder. There is thus provided a variable stroke operation which makes the operation of the system much more effective. Unlike previous inventions, the proposed system is very simple in design, yet it is able to dynamically adapt itself to different wave conditions. In the event of excessive stroke, bumpstops (or air springs) are used to prevent direct contact between the cylinder heads and the piston faces.

According to an aspect of the invention, the float is made with hollow sections for receiving and processing compressed air. Following compression in the cylinder(s), the pressurized air is pumped into the hollow float, which therefore doubles as an air receiver/accumulator. This large-volume receiver acts to smooth the air from the compressor(s) before it enters the turbine, thus reducing speed variation and greatly increasing conversion efficiency. The turbine can either be housed on the WECWAC, or off-board on a separate platform or back on shore. In the latter configurations, air from a number of WECWACs would be combined to drive a single large and highly efficient turbo-generator.

Furthermore, the compressed air from a plurality of individual WECWACs is combined for transmission through a smooth pipe, for low loss power transmission, to an electrical generator. Thus the air compression system of each WECWAC can be networked to a single turbine. This 'farm' of WECWACs can power a large central turbo-generator. It is generally known that the conversion efficiency of turbine-generators increases with size. With the air-distribution system sized to minimize transmission losses, the overall system efficiency will be high. Furthermore, the system will allow the turbine and generator electronics to be housed on a stable platform or on shore. With complexity removed from the individual buoys, the networked system will be easier to maintain and repair. The cost of each buoy will also be significantly reduced. These benefits will all combine to enable a significant reduction in overall cost of power generation.

BRIEF DESCRIPTION OF THE DRAWINGS

In the accompanying drawings like reference characters denote like components.

DETAILED DESCRIPTION OF THE INVENTION

Figure 1:
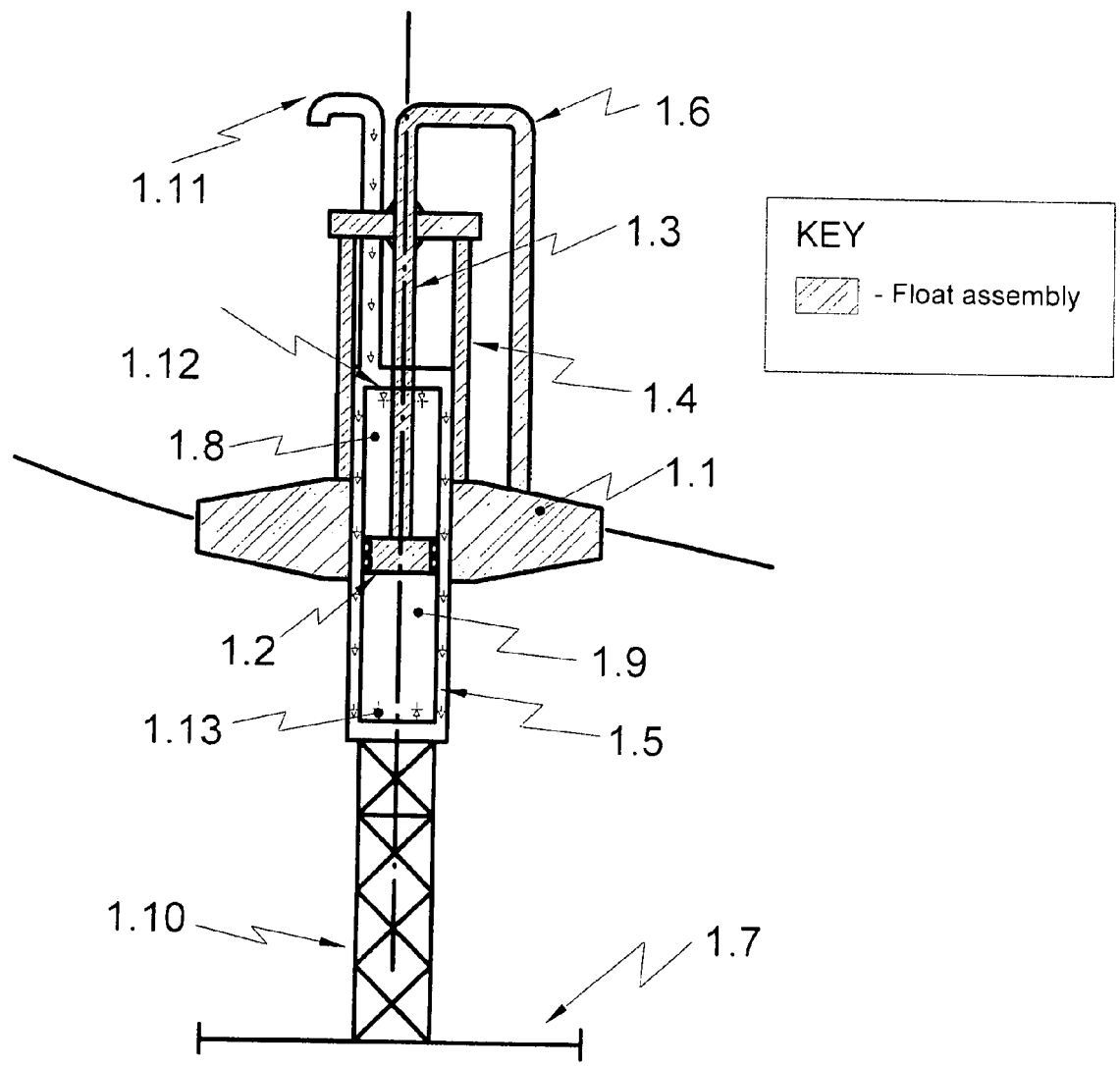
FIG. 1 is a highly simplified cross-sectional diagram of a wave energy converter with air compression (WECWAC) embodying the invention.

Referring to FIG. 1, there is shown a highly simplified diagram of a WECWAC embodying the invention. The WECWAC includes a float 1.1 and a central spar 1.10. Mounted above the central spar 1.10 is a cylinder body 1.5 and attached to the bottom of the central spar 1.10 is a heave plate 1.7. The float 1.1 defines a first floating body which is designed to move in phase with the waves. The float can be any shape. In a preferred embodiment, the float is toroidal with a central opening shaped to allow it to move up and down relative to the centrally located spar. The spar 1.10 with the cylinder 1.5 and the heave plate 1.7 defines a second floating body which is generally designed to move out of phase with the waves. The first and second floating bodies thus tend to move out of phase relative to each other. Each floating body is able to move independently of the other, with only air pressure and friction linking the two.

The float 1.1 is connected via a bridge 1.4 to a piston rod 1.3 which is connected to piston 1.2. The bridge 1.4 and piston rod 1.3 provide a fixed rigid connection which ensures that the piston 1.2 moves with the float 1.1. The piston 1.2 effectively divides the cylinder 1.5 into two chambers (upper chamber 1.8 and lower chamber 1.9) within which air compression can take place on the up stroke and down stroke of the piston. In the arrangement shown in FIG. 1, air is compressed in chamber 1.8 and in chamber 1.9; i.e., both above and below the main piston 1.2. Thus the compressor is said to be 'double-acting'.

Air is drawn into chamber 1.8 via inlet piping 1.11 and upper inlet valves 1.12. Similarly, air is drawn into chamber 1.9 via inlet piping 1.11 and lower inlet valves 1.13. In FIG. 1, compressed exhaust air passes through exhaust valves (not shown) in hollow piston 1.2, and then through the hollow piston rod 1.3 and single exhaust pipe 1.6. Evidently, alternate piping arrangements may be used to collect the compressed air. In FIG. 1, compressed air is stored inside the hollow float 1.1, but it could instead be supplied to holding tanks located in other suitable locations.

The heaveplate 1.7 is located well below the surface where it is not strongly affected by waves. When the heave plate moves through still water, it creates a lot of drag and entrains a large mass of water. This allows it to oppose the large forces generated by air compression in the main cylinder 1.5.

Pipework and Valving

Figure 2:
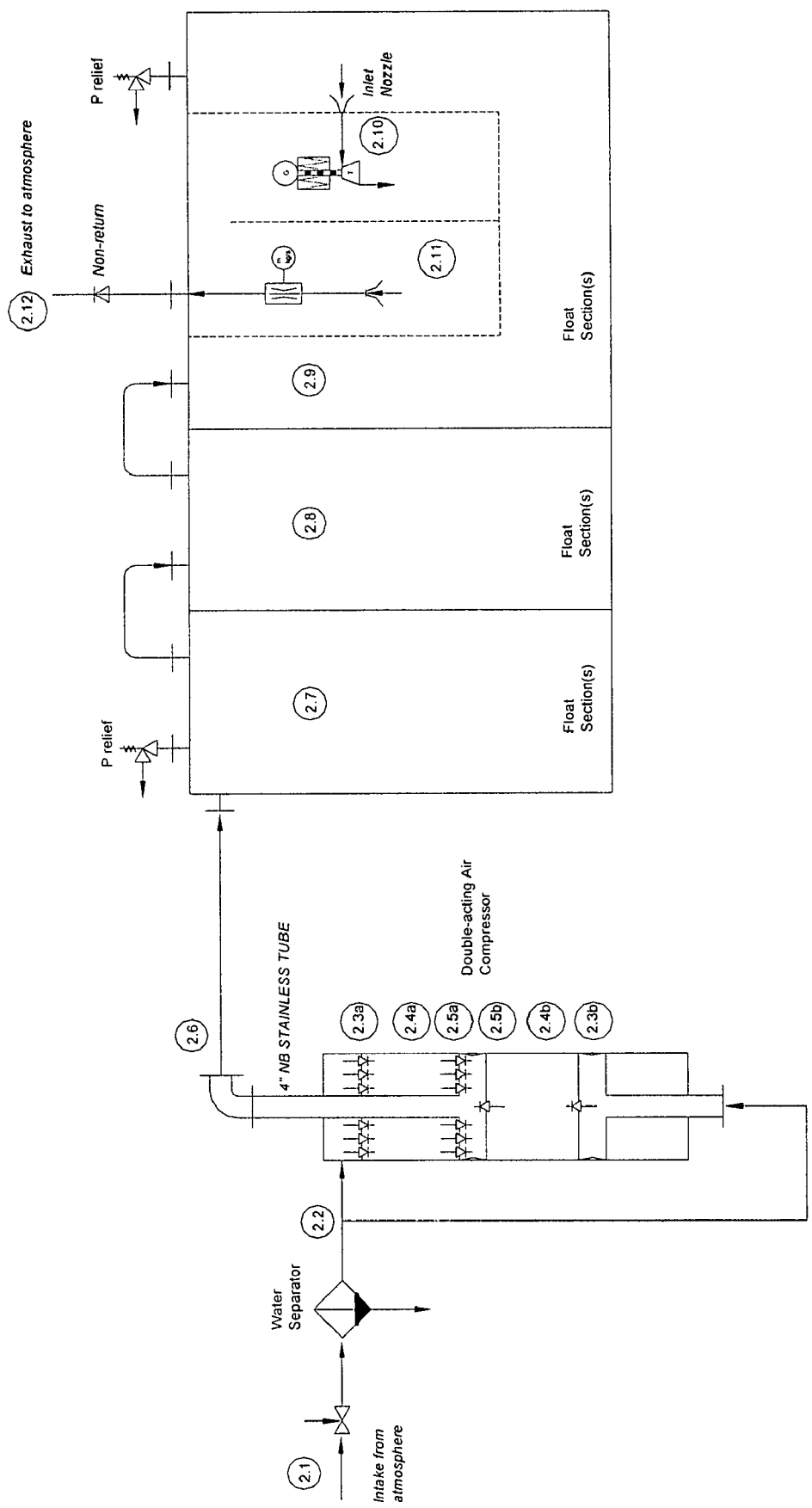
FIG. 2 is a simplified pneumatic diagram of the system.

FIG. 2 is a diagram of the pneumatic system shown in FIG. 1. Air enters from the atmosphere 2.1 and passes through a water separator 2.2. Air is then ducted into the upper and lower chamber of a cylinder (2.4a & 2.4b) through one-way valves (2.3a & 2.3b). The piston is driven directly by the float and it compresses the air in both the upper and lower chambers. It is therefore said to be double-acting. Once compressed, air then enters the hollow piston through exhaust valves (2.5a & 2.5b in FIG. 2). Exhaust valves are built into the upper and lower face of the piston. Valves are one-way (non-return) valves similar to those normally used in reciprocating compressors, and may be of the plate or poppet type. The detailed design of the piston and correct sizing of the exhaust valves are both important in order to minimize pumping losses. The compressed air then travels up through the hollow piston rod and into different sections of the hollow float (2.7, 2.8 & 2.9). The float can be divided into separate sections as required, depending on the manufacturing method used.

In the configuration shown in FIG. 2, a turbine 2.10 is housed inside one of the float sections, where it is protected from the elements. Air passes into the turbine (2.10) and expands into a turbine tank (2.11). After passing through a lightly-loaded non-return valve, air is then expelled back to atmosphere (2.12). In another embodiment of the system (not shown), the turbine is stored remotely, for example, on an adjacent floating platform.

Variable Stroke Mechanism

Due to the irregular nature of ocean waves, an effective air-pumping buoy must be able to vary its compression stroke. If variable stroke is not used, delivery pressure from the WECWAC will drop substantially in small seas, making it extremely difficult to generate power efficiently. A number of variable-stroke concepts have been proposed in the past. However, none of these systems are practical, simple or self-regulating, and therefore reliability and cost are both compromised. In known WEC systems, the central spar is generally held relatively stationary by a large deep-water heave plate(s). In systems embodying the invention, the heave plate is used to stabilize the WEC and is also used to vary the stroke of compression. The use of a heave plate is used to illustrate an element performing the desired function. It is noted that alternative reactive bases can be used to control the heave of the spar and its buoyancy. That is, a significant aspect of the invention includes the use of a 'heave plate' to do two jobs: 1) restrain the heave motion of the spar (and therefore provide a reaction force for power generation) and 2) regulate the stroke of the air compression system. This variable-stroke mechanism is passive and is important in that it allows the system to operate effectively for different wave conditions (e.g., even in a low amplitude wave environment).

Figures 1A, 1B:
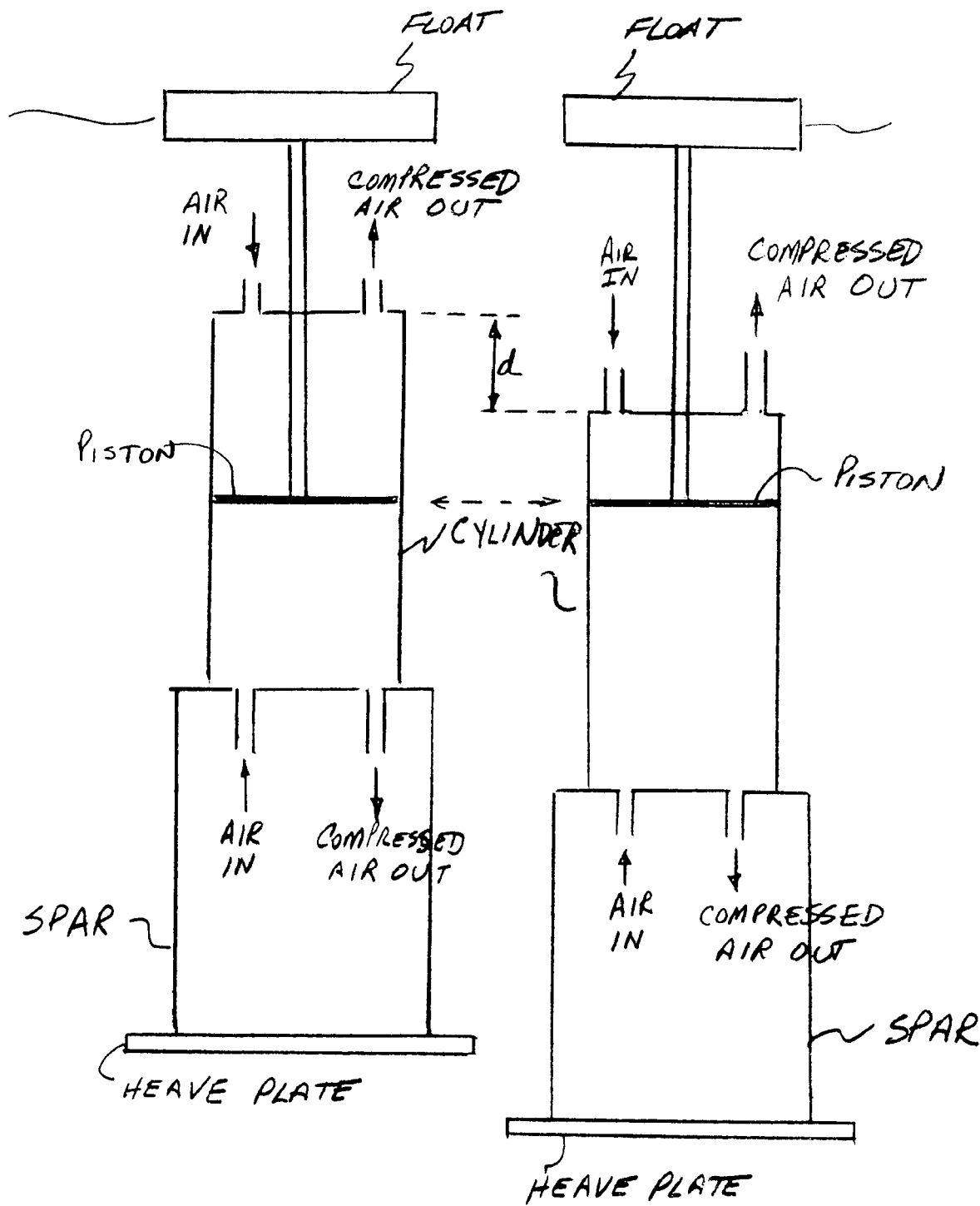
FIGS. 1A and 1B are schematic diagrams illustrating the operation of the WEC of FIG. 1 for different wave conditions.

The weight and buoyancy of the spar (1.10) are adjusted so that in still water the spar sits very low in the water, with only the top part of the cylinder (1.5) above water level. This means that for waves of small amplitude, the maximum swept volume of the upper chamber 1.8 is reduced, allowing air to be compressed fully by the piston. Under a normally anticipated wave environment, the cylinder will be positioned such that the piston, in the mid point of a wave cycle, is generally centered between the top and bottom of the cylinder as shown in FIGS. 1 and 1A. That is, the volume of compressed air (or any suitable gas) will be genially equal for chambers 8 and 9. However, in still water, the cylinder and spar (as designed) drift down as shown in FIG. 1B. The top of the cylinder moves down and is close to the top surface of the piston. The up/down motion of the cylinder/spar is relatively slow compared to the response time of the piston which is tied to the float which move in phase with the waves. Thus the stroke (travel) of the piston to compress the air in the upper chamber has been reduced. Thus effective compression occurs in the upper chamber even for low amplitude waves.

As wave height continues to increase, the cylinder is pushed upwards under the air pressure in the upper chamber 1.8 and the maximum swept volume of the upper chamber 1.8 increases. Once air pressure inside the cylinder builds up, the bumpstops will not be frequently used. Also, as wave height increases, the lower chamber 1.9 begins to pump, and the system is then balanced, with the upper and lower chambers pumping against each other.

If there is a sudden increase in wave height (excessive stroke), bumpstops are used to prevent direct contact between piston and cylinder heads. Bumpstops can be thought of as any shock absorbing device (pneumatic, hydraulic, or simple mechanical spring). An air spring can also be built into the main cylinder (1.5), to prevent contact between the piston faces and cylinder heads. Once the system has 'booted' up, the bumpstops will hardly be used.

Thus, a WEC embodying the invention includes a float moving in phase with the waves and a vertical structure (spar) for receipt of a cylinder of an air compressor containing a piston for compressing air within the cylinder. The piston is rigidly connected by a bridge 1.4 to the float which bobs up and down in response to passing waves. The up/down motion of the cylinder is restrained (e.g., by a heaveplate), and is therefore relatively unresponsive to passing surface waves. Also, in still water, the cylinder and spar with a heave plate or with a like structure appended thereto, tend to sink within the water until the cylinder upper end rests close to the piston upper surface. With passing surface waves, the float tends to move relative to the stationary cylinder with the piston thus moving within the cylinder relative to the cylinder upper end. The piston stroke length is thus a function of the wave amplitude, and air compression within the cylinder upper chamber is obtained even with quite small amplitude waves.

Another significant aspect of the invention includes the use of a hollow float that doubles as a wave-follower and an air receiver. In a preferred embodiment, the float is toroidal, to allow it to slide up and down around the spar. However, the use of the float as an air receiver is not essential. In alternative configurations, air storage receivers can be housed in the spar, or the interconnecting air pipe work, or on shore. Indeed, as the number of WECWACs increases, smoothing will occur more and more within the interconnecting pipe work, and storage for smoothing may be less important.

The power take off (PTO) system of WECWACs embodying the invention thus includes an air-compressor which is used to drive a turbine-generator for generating electricity. An interesting aspect of the invention is that a variable stroke is obtained by moving the position of the cylinder relative to the piston. In the described embodiments the position of the cylinder is essentially automatic once the buoyancy of the spar/cylinder combination has been selected. The inventive concept applies to other suitable means for moving the cylinder relative to the piston. It should be appreciated that the positioning of the cylinder is relatively independent of the stroking movement of the piston which is a direct function of the float, generally in phase with the waves.

Networked WECWAC Buoys

Figure 3:
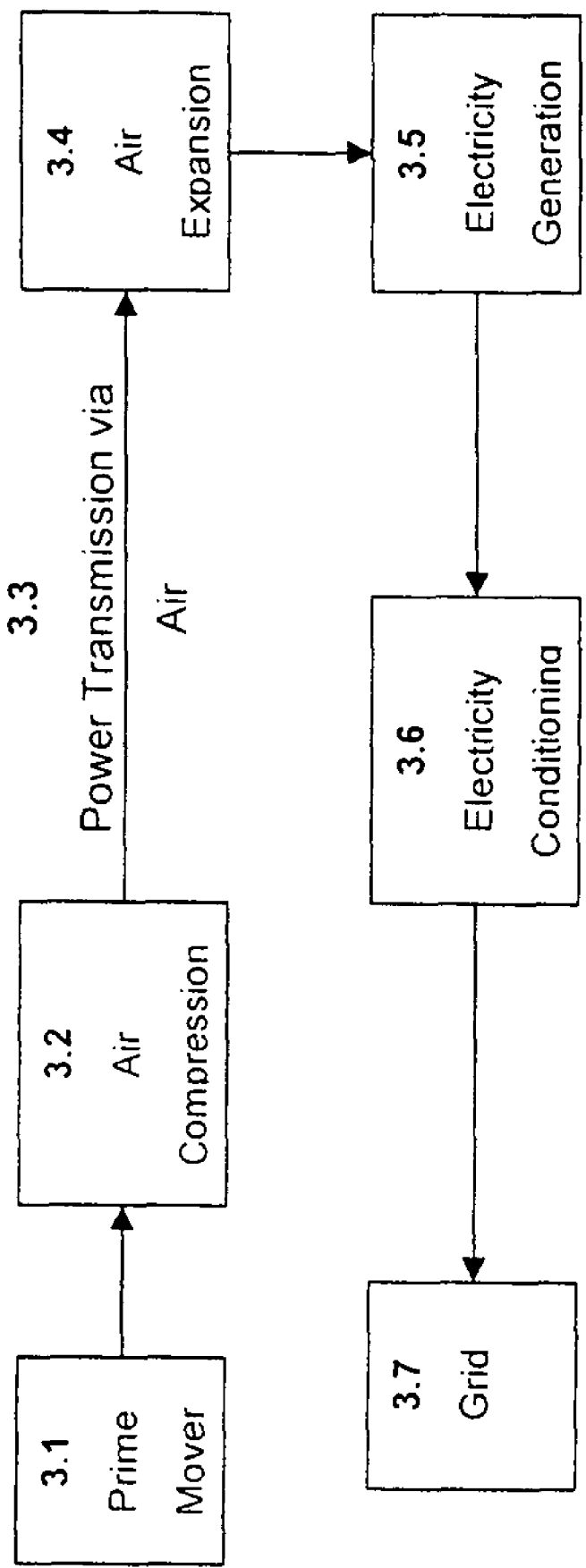
FIGS. 3, 4 and 5 are schematic diagrams illustrating various systems making use of the present invention.

Still another aspect of the invention is shown in FIG. 3. Box 3.1 of the diagram references a prime mover which can be any apparatus for capturing energy from an energy source, for example, a wind mill. In a preferred embodiment, however, the prime mover comprises a wave energy converter with air compression (WECWAC) such as the device described herein or as disclosed in U.S. Pat. No. 6,768,216, issued Jul. 27, 2004, the subject matter of which is incorporated herein by reference.

Figure 4:
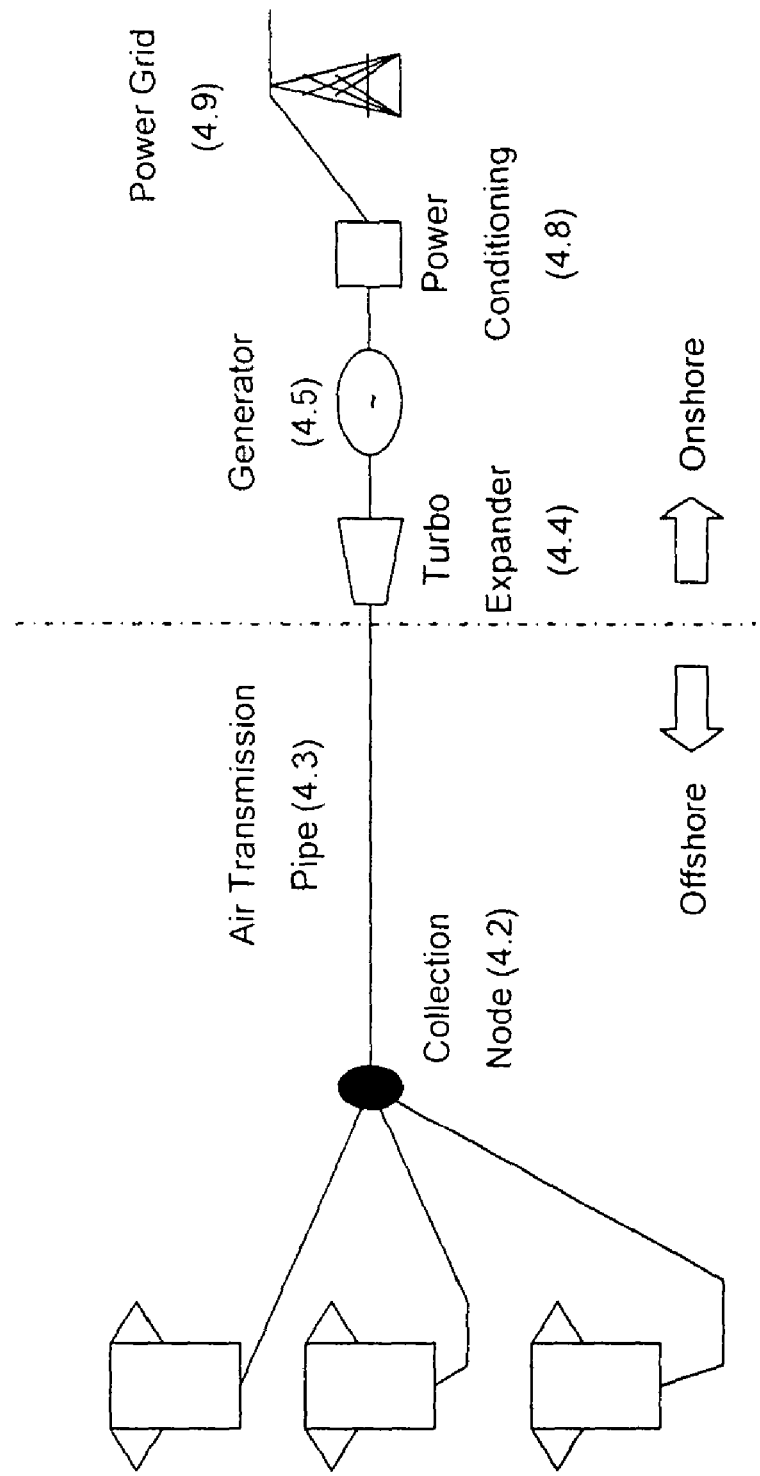

FIG. 4 herein shows a network of WECWACs (e.g., 110) which includes a cylinder mounted for movement, in response to passing waves, relative to a stationary support. The relative movement between the apparatus parts is used to drive a PTO system. In accordance with this invention, the relative movements of the WEC parts are used to drive a gas compressor (Box 3.2, FIG. 3) for pressuring a suitable working gas, for example nitrogen, but preferably, ambient air.

In an embodiment, the air is compressed to a pressure in the range typically 0.5-10 bar. Ideally, the output from each WECWAC is at a constant pressure, but the compressible nature of air means that this is not required. The pressure range selected is suitable both for efficient transmission of the pressurized air (item 3.3, FIG. 3) and for conversion of the energy of the air to rotary motion using single or multi-stage expanders (Box 3.4, FIG. 3).

As is generally known, air transmission along a pipe (i.e. a smooth pipe) is very efficient with low frictional losses. For example, 40 MW can be transmitted via a 1.2 m diameter pipe over 1.5 km with a loss of less than five percent. Pipes used for transmitting air are not expensive, and in the event that leakage occurs, it is only air that leaks from the pipe with low environmental impact. The pipe also acts as a natural reservoir to store energy and to smooth the output of the electrical generator driven by the pressurized air.

Useful work is performed by expansion of the pressurized air. Air expansion is by one or more turbo-expanders, running at high speed and converting the air pressure to high-speed rotary motion-typically at 5,000-70,000 rpm. The high-speed enables efficient energy conversion via a single or multi-stage expander, while also keeping size and weight to a minimum. As well as driving a high-speed shaft, air is exhausted from the expander at low temperatures (as low as minus 80 degrees C.). The cool air can then be used to cool the generator and auxiliaries, but could also be used for air conditioning or another industrial process requiring cold air (freezing/drying).

Electricity is produced (Box 3.5, FIG. 3) using a high-speed electric generator, which is preferably connected directly to the turbo-expander and therefore running at the same speed (15,000-50,000 rpm). At this speed electricity generation is very efficient, and also requires only small machines. The generator is preferably a permanent magnet machine with a three phase output, preferably running on air or magnetic bearings because of the high speeds involved. Generator cooling is via a closed air or liquid system with indirect cooling of this primary air from the cold air being produced at the exhaust of the expander, or by seawater. If necessary, a gearbox can be used to reduce the speed of the generator.

The electricity produced is preferably in a medium range: 500-800 volts, and a frequency of 250-500 Hz. However, for smaller systems, it may be useful to generate low voltage DC. The output electricity is rectified and inverted via a power electronics unit to produce an output at a steady frequency, high quality, and with sufficient protection to enable it to be coupled to the grid. A suitable transformer is used to match the local grid voltage. Commercial units are now available which can do all the electrical power conditioning and can provide all the required protection relays.

As well as creating an efficient power take-off and conversion system, using air gives a number of further significant benefits:

Power transmission over short or medium distances is efficient using air, so such air transmission can be used to connect a number of local WECWAC devices, and even to transmit the energy to where the power grid is located.

The opportunity to transmit "raw power" via air means that the electronic components for controlling the process can be housed in a safe and clean environment. Ideally, the generating equipment is onshore and directly next to the power grid connection point.

The energy from surface waves occurs on an intermittent basis, but by combining a number of devices together to feed a single turbo-expander, a significant portion of this intermittency can be removed.

As previously noted, the pipes through which the air is transmitted act as smoothing and storage reservoirs, but additional storage can be added easily and economically to enable a more consistent output. It is even possible to move to largescale energy storage by pumping air underground into salt caverns or the like. This would make the reliability and predictability of the output significantly better; underground storage via compressed air has been considered as an alternative to pumped-storage for "storage" of electricity.

Solar or industrial waste heat can also be added to the compressed air from the WECWAC network. This significantly boosts turbine power and also allows very efficient conversion of solar energy into electrical power.

The overall system is economical. The small size and high-speed nature of the generator and expander make them inexpensive to supply and fit, and the conditioning electronics are commercially available. Also, as previously mentioned, pipeline for interconnection and transmission is readily available and relatively inexpensive.

FIG. 4 shows an arrangement according to the invention including a number of WECWACs floating on the body of water with each WECWAC creating compressed air as previously described. The pressurized air from each WECWAC is transmitted to a collection node 4.2 also disposed in the body of water, and the collected pressurized air is transmitted to a turbo-expander 4.4 disposed on shore adjacent to a generator 4.6 controlled by a power conditioning unit 4.8. The electrical power thus produced is loaded onto a power grid 4.9.

Figure 5:
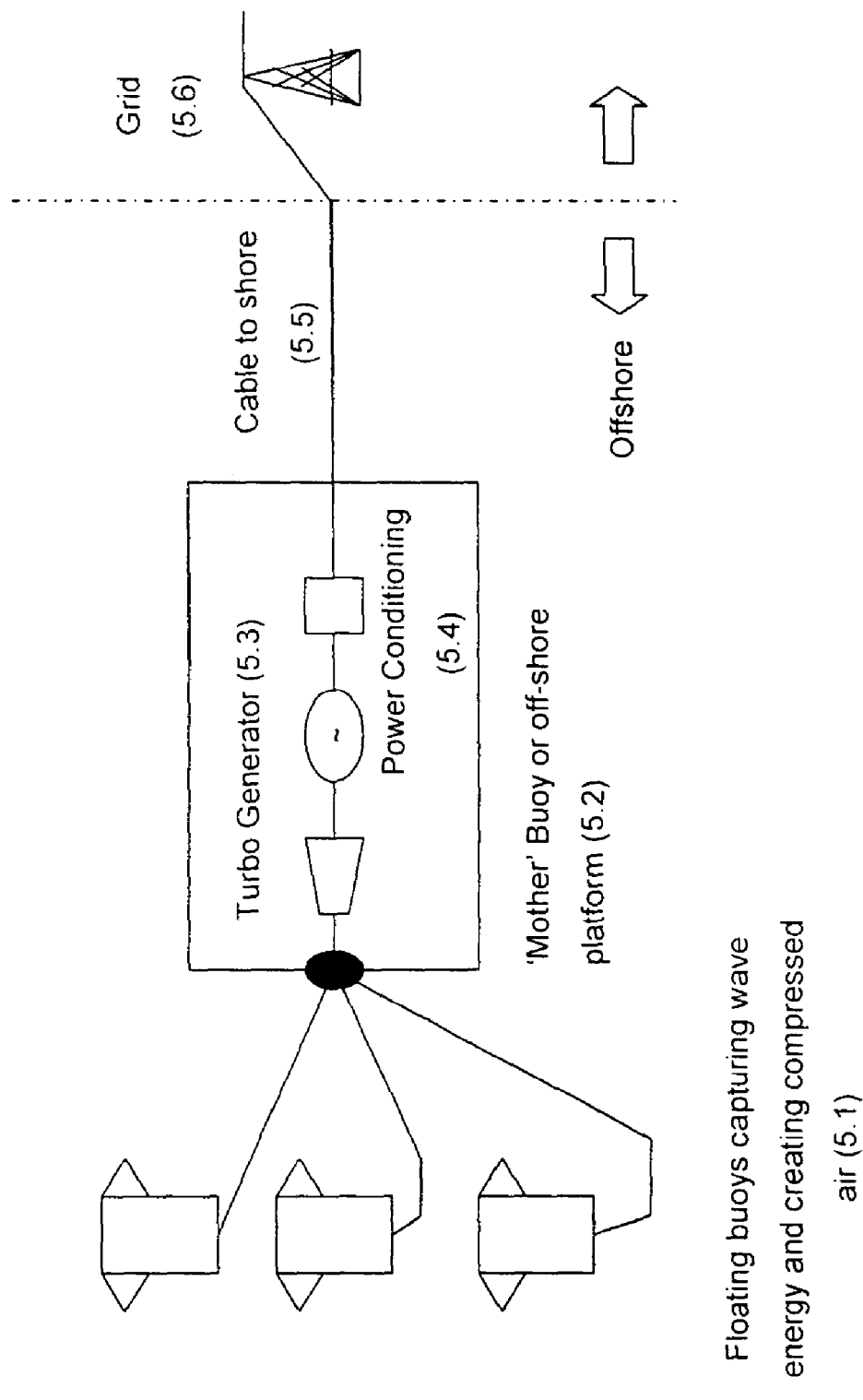

In FIG. 5, the turbo-expander generator and power conditioning units are disposed offshore either on a "mother" buoy or on an off-shore platform. The electrical power is thus generated offshore and conducted by cable to a power grid on shore.

What is claimed is:

1. A wave energy converter (WEC) comprising:
   a float intended to lie along the surface of a body of water and designed to move generally in-phase with the waves present in the body of water;
   a spar-like element intended to float in the body of water, the spar like element tending to move up and down in a vertical direction in response to passing waves, generally out of phase relative to the waves;
   impeding means attached to the spar-like element for increasing the effective mass of the spar for stabilizing the spar, impeding, while still allowing, its up/down motion and causing it to drift down in still water;
   a cylinder attached to one of the spar-like element and said float; said cylinder for enabling air to be compressed, said cylinder being generally enclosed with at least one inlet port for allowing atmospheric air to be drawn into the cylinder and at least one outlet port for outputting compressed air; and
   a piston within the cylinder rigidly connected to the other one of the float and spar-like element whereby the piston compresses air within the cylinder as a function of the movement of the float relative to the spar-like element.

2. A WEC as claimed in claim 1, wherein the cylinder is attached to the spar and the piston is connected to the float and wherein the inner portion of the cylinder above the piston is defined as an upper chamber and wherein the inner portion of the cylinder below the piston is defined as a lower chamber; and wherein the position of the cylinder relative to the piston changes as a function of the amplitude of the waves, decreasing the volume of one of the two chambers while increasing the other for regulating the volume of the compression chambers within the cylinder, as a function of the wave amplitudes, for enabling the compression stroke of the piston to be automatically regulated.

3. A WEC as claimed in 2, wherein the cylinder has an upper chamber above the piston and a lower chamber below the piston and wherein air entrained within the upper chamber is compressed on an up stroke of the piston and air entrained within the lower chamber is compressed on a down stroke of the piston.

4. A WEC as claimed in claim 3, wherein the impeding means is a heave plate attached to the submerged portion of the spar-like element.

5. A WEC as claimed in claim 3, wherein, for low amplitude waves, the volume of the upper chamber is decreased whereby the compression stroke of the piston to produce a desired level of air compression is decreased.

6. A WEC as claimed in 2, wherein the float includes means to receive and process compressed air.

7. A WEC as claimed in claim 6 wherein a turbine generator is located within the float and compressed air is distributed to the turbine generator to generate electricity.

8. A WEC as claimed in claim 6 wherein a turbine generator is located outside of the WEC and a piping means is provided to distribute compressed air from the WEC to the turbine generator to generate electricity.

9. A WEC as claimed in claim 1 wherein the cylinder is attached to the spar and the piston is connected to the float and wherein the cylinder is divided into an upper chamber and a lower chamber by said piston, and wherein the combination of the spar and the impeding means is selected such that, in response to waves of small amplitude, the cylinder attached to the spar tends to move down relative to the piston, whereby the volume of the upper chamber is decreased enabling air to be compressed even in low amplitude waves.

10. A WEC as claimed in claim 9 wherein the buoyancy of the spar and the sizing of the heave plate are selected to enable the dynamic and automatic regulation of the stroke of the piston in a compression chamber.

\* \* \* \* \*